United States Patent Office 3,361,558
Patented Jan. 2, 1968

3,361,558
METHOD OF FORMING DUCTILE METALS
David M. Scruggs, Southfield, Mich., assignor to The Bendix Corporation, a corporation of Delaware
No Drawing. Application Feb. 3, 1964, Ser. No. 342,291, which is a division of application Ser. No. 182,074, Mar. 23, 1962, now Patent No. 3,175,279, dated Mar. 30, 1965. Divided and this application June 10, 1966, Ser. No. 556,561
1 Claim. (Cl. 75—53)

ABSTRACT OF THE DISCLOSURE

A method for achieving matrix metals of high purity and having improved physical properties. The method involves selecting a metal which is capable of forming a spinel, adding a metal oxide which will form the spinel and holding this mixture at elevated temperature in a plastic state while impurities are absorbed by the spinel, melting the mixture to allow the spinel and absorbed impurities to settle out of the metal thus purifying the metal. Subsequently, the spinel and impurities settle out whereby they can be removed.

---

The present application is a division of my co-pending application Ser. No. 342,291 filed Feb. 3, 1964, now Patent No. 3,284,194 issued Nov. 8, 1966, which is a division of application Ser. No. 182,074, filed Mar. 23, 1962, now U.S. Patent 3,175,279 issued Mar. 30, 1965 which, in turn, is a continuation-in-part of my application Ser. No. 88,302, filed Feb. 10, 1961 and now abandoned.

The prior art has known that some of the physical characteristics of commerically prepared metals can be improved upon if the metal is caused to be free of all impurities such as: hydrogen, nitrogen, carbon, sulphur, oxygen and perhaps in some instances the inert gases. These impurities, for example, tend to make numerous metals brittle to such an extent that in many instances the metals could not be used commercially heretofore. It has been extremely difficult heretofore to rid metals substantially completely of the contaminates above enumerated; so that metals of high purity have not been available to the metal fabricating arts; and so that in some instances, the true physical properties of some pure metals have not even been known precisely.

I have discovered that when spinels in finally divided form are distributed throughout a metal body, and the metal body is hled at elevated temperatures for a period of time, the spinels act as "getters" or repositories for even minute amounts of impurities (such as nitrogen, oxygen, carbon, sulphur and perhaps hydrogen) and thereby purify the metal body to a state which in some instances has been commercially unattainable heretofore. The resulting compositions of matter may, for example, exhibit degrees of ductility and strength at room temperatures never known before.

Spinels generally are a mixture of a metal monoxide and a metal sesquioxide which combine according to the general formula $MO.M_2O_3$: where the M's may be the same or dissimilar metals. The monoxide and sesquioxide unite in a complex cubic crystalline structure, and have the property of uniting with additional metal oxides. The spinels usually have a melting point above that of one of the metal oxides from which it is formed so that they may be used to increase the melting points of the oxides of any particular metal. In the case of chromium, for example, chromium sesquioxide in the presence of Cr melts at a temperature of approximately 400° F. below the true melting point of chromium (which is 3450° F.); and because of a fluxing action of the chromium sesquioxide on the metallic chromium, the apparent melting point of chromium in oxidizing environments may be as much as 400° F. below its thue melting point. The formation of a suitable spinel out of the chromium sesquioxide that is formed during oxidation, in effect raises the melting point of the chromium oxide and prevents its fluxing action on the metallic chromium. The spinels formed have the ability to unite with chromium sesquioxide beyond the stoichiometric quantities required to form the spinel. A mixture of chromium spinel and chromium sesquioxide forms a tightly fitting complex oxide coating which resists flaking, and which resists the migration of oxygen molecules into the metal body. In the case of chromium, for example, the overall effect achieved by the formation of the complex oxide is to raise the temperature of the chromium sesquioxide liquidous line and thereby prevent melting of the chromium below approximately 3450° F.

Other secondary effects are also produced by the distribution of the spinels throughout metal bodies. The distribution of spinels in finally divided form may, for example, control the grain growth of metal powders during sintering. Metals tend to form crystals having definite dihedral angles. By distributing these finely divided spinels in a manner spacing them at a desired distance apart, the crystalline growth of the metal will proceed to a size corresponding generally to the spacing of the spinel particles whereupon further increase in grain size would require the to increase the dihedral angle of the crystals beyond their normal equilibrium angles. Greater energies are required to increas the dihedral angle of the crystals beyond their equilibrium values, and therefore the amount of grain growth is controlled by the dispersion of the spinel throughout the metal.

The distribution of the spinels in finely divided form tend to remain in the grain boundaries where they provide a keying action which, in general, increases the strength of the basic metal in which the spinels are located.

Further observed effects include an increase in machinability as well as an increased resistance to galling by reason of the addition of the spinels. In general, materials formed according to applicant's method of purifying metals result in cermets having properties above and beyond that which can be attributed to the increased purity of the matrix metal. It is entirely possible, of course, that materials prepared according to my methods of preparation can be further refined to remove the spinels after they have absorbed the impurities from the base metal; so that metals of extremely high purity are formed which do not include the spinels. Applicant therefore not only teaches a method of purifying metals, but teaches a whole new class of cermets heretofore unknown.

As previously indicated, spinels are formed by uniting a monoxide and a sesquioxide in a predetermined manner. In general, monoxides are formed by any metal from group II of the periodic table and sesquioxides are formed by any metal from group III of the periodic table. Generally speaking, therefore, any oxide of a metal in either group II or group III of the periodic table will form a spinel with the appropriate oxide of a metal from the other group of the periodic table; so that my method of purifying metals can therefore be used to purify any metal in group II or group III of the periodic table. Applicant's method of purifying metals is not limited, however, to group II and group III metals; inasmuch as metals of the higher numerical groups of the periodic table, although capable of forming higher oxides than a sesquioxide, go through transition periods wherein they will form either a monoxide or a sesquioxide. This transition may be arrested either in the monoxide or sesquioxide state by the formation of a spinel with a dissimilar appropriate metal oxide.

From the above explanation of the principles involved, it will be apparent to those skilled in the art that a suitable combination can be worked out for the purification of substantially any metal in group II and group III and the transition metals. By way of example, the following is a list of metals whose purity can be improved by the use of the principles of the present invention. This list is not intended to be all inclusive, but is given by way of enumerating suitable examples, only:

| | |
|---|---|
| Iron | Magnesium |
| Cobalt | Aluminum |
| Beryllium | Manganese |
| Chromium | Nickel |

Of this list, the metals iron, beryllium, cobalt, magnesium, manganese, and nickel can be oxidized into the monoxide state, wherein they will form a spinel with a suitable metal sesquioxide, such as for example: $Al_2O_3$, $Cr_2O_3$, $Y_2O_3$, $La_2O_3$, $Sc_2O_3$ and $Ac_2O_3$. The metals chromium and aluminum form the sesquioxide; so that their spinels are formed with a suitable monoxide of a metal, as for example: BeO, MgO, CaO, ZnO, SrO.

In general, the metal oxides which are added to the basic metals can be varied over a considerable percentage range depending upon the degree of secondary effects desired, as for example, the degree of oxidation resistance required. In general, the strength of the cermet will begin to fall off when the percent by volume of the ceramic that is added increases above approximately 15%.

In order that purification of the matrix metal can be effected by the metal oxides which are incorporated into the base metals, some form of oxygen must be present; so that sufficient spinel will be formed to absorb the impurities previously mentioned, for example: nitrogen, carbon, sulphur, and of course, take with it the oxygen. What is more, the cermet material must be held at elevated temperature conditions sufficiently long so that these impurities will migrate to the spinel that is formed. It is also preferable that the materials be heated under such conditions and atmospheres that other impurities will not penetrate into the body of the base metal from exterior sources.

The lower limit of the amount of ceramic which can be used will be, of course, dependent upon the amount of impurities that exist in the base metal. In some instances, less than 1 or 2% by volume of the ceramic metal oxide additive can be used; and from experience there should be approximately one-half to three quarters of 1% by weight of oxygen present in the starting metal powder to oxidize the base metal, and thereby form the spinel which produces the purification of the base metal. The mere presence of a dissimilar metal oxide in a base metal will not produce applicant's improved results, if there is not also present the oxygen to oxidize the base metal and form the spinel which produces the purification. In general, practical considerations determine the particle size of the oxide which is used. The smaller the particles, the faster will be the purification reaction and —325 mesh is to be preferred. In those instances where the spinel is intended to control the dispersion hardening of the metal, the particle size should not exceed approximately 1 micron.

After the spinel is formed, the material should be held at a sufficiently elevated temperature which may be called the activation temperature so that the molecules of the impurity will have sufficient mobility to impinge upon, and be held by, the spinel. This, of course, will vary with the base metal; and in the case of chromium, for example, a temperature of 2900° F. for 1 hour will in general provide the desired purification. In the case of beryllium, 3 hours at 2100° F. might be used to achieve the desired purification. Impurities which are absorbed by the base metal during subsequent use can be removed at any time that the cermet is again heated to its activation temperature up to the limit of solubility in the spinel.

A further beneficial effect is had where the materials are made by means of powdered metallurgy techniques by accomplishing the purification and the sintering of the matrix metal in a single heating step. If the heating is done at such a high degree of vacuum that the absolute pressure is below the vapor pressure of the matrix metal at the sintering temperature, further benefits are derived. By sintering under such conditions, the vapors of the matrix metal have great mobility and therefore the sintering of the matrix metal takes place at an extremely rapid rate. In addition, the impurities in the base metal are swept away by the increased mobility "boiling" of the atoms of the matrix metal, to carry them into contact with the spinel. Some of the impurities will, of course, be swept completely out of the base metal by the vacuum; but this will in general be of minor importance compared to the rapid capture and retention of the impurities by the spinels.

It is believed that the various objects achieved, and the advantages which this invention has, will be readily apparent to those skilled in the art from reading the above principles; and various specific examples will now be given to demonstrate some of these principles and advantages.

Some of the improved physical properties achieved by applicant's method of improving the purity of a base metal is demonstrated by the following two examples:

Example I

A thorough mixture of the following powders was compacted at 20,000 p.s.i. and sintered at 290° F. for 2 hours in a 1 micron vacuum:

| | Percent |
|---|---|
| Electrolytic chromium powder (—200 mesh) | 93.5 |
| MgO powder (—325 mesh) | 6.0 |
| Titanium powder (—325 mesh) | 0.5 |

The material was cooled and machined into a billet approximately 3 inches in diameter and 6 inches long; and the material was extruded through a nominal 1 inch opening in a Lombard Horizontal Extrusion Press. Prior to extrusion the material was heated at 2200° F. in an argon atmosphere at atmospheric pressure. After cooling down, the material was machined into a .189 inch diameter tensile bar of a 1 inch uniform length and subjected to a tensile test wherein the material was loaded at a rate of 300 lbs./min. The bar had an elongation of 28% over a ¾ inch gauge length, and gave an ultimate strength of 54,500 p.s.i. There was a reduction in the area of 13%.

In order to compare the temperature of transition from ductile to brittle behavior, specimens approximately ½ inch in diameter and approximately 1 inch long are heated to various temperatures and are placed vertically on the bed of a hydraulic press. These specimens are impact forged at the rate of 10 inches a second at various elevated temperatures. All temperatures above approximately 250° F. gave more than 50% reduction while those colder than this temperature cracked—showing that the transition temperature at this stress rate is approximately 250° F. The best transition temperature which has been achieved heretofore with eletrolytic chromium has been approximately 600° F.

Example II

By way of comparison, the following mixture of powders was prepared and sintered in the same manner given above for Example I:

| | Percent |
|---|---|
| Electrolytic chromium powder (—200 mesh) | 99.5 |
| Titanium powder (—325 mesh) | 0.5 |

An envelope of nickel surrounded the chrome billet and the material was heated and extruded in the same manner given for Example I above. Thereafter, tensile bars were made in the same manner as described for Example I, and the properties established for the chromium at room temperature were: yield point 27,000 p.s.i., ultimate 35,900 p.s.i., and an elongation of only 1.5%.

*Example III*

As indicated above, the metal oxide which is incorporated into the base metal structure forms a spinel.

A specimen was prepared using the procedure outlined in Example I above. The metal portion was dissolved out of the sample with hydrochloric acid, leaving only the ceramic contents, and this material was ground up to −325 mesh size. This powdered ceramic material was suitably prepared for X-raying in a North American Philips type 52056 X-ray camera. The X-ray lines which were obtained from this example gave an X-ray pattern whose lines corresponded excellently with the American Society for Testing Materials comparison charts 2–1056 and 9–353. These ASTM charts give the patterns for chromepicotites and magnesiochromites respectively, which materials cover substantially any combination of magnesium and iron monoxide in combination with either chromium or aluminum sesquioxide that exist. It should be noted that there is very little difference between X-ray pattern of chromepicotite and magnesiochromite; and in fact, spinels generally have a characteristic pattern.

Spinels have the ability to incorporate other metal oxides. In general, this complex mixture of oxides will form a very tight and flake resistant coating which prevents contamination of the base material from the surrounding atmospheres, even at elevated temperatures. The ability of the spinels to provide this protection is demonstrated by the following examples.

*Example IV*

One example of applicant's preferred material was made by sintering an intimate mixture of the following materials in a vacuum for 1 hour at 3100° F.:

| | Parts by wt. |
|---|---|
| Electrolytic chromium (−325 mesh particle size) | 94 |
| MgO (nominal 5 micron size) | 6 |
| Titanium (−200 mesh particle size) | 0.5 |

The above powders were blended for 10 minutes in an elbow blender, were then screened through a 200 mesh screen, and then blended for another 10 minutes with a rotary agitator or intensifier installed in the elbow blender. The above mixture was then compacted into a 2 inch diameter specimen at 20,000 p.s.i. pressure before sintering, and had a modulus of rupture at room temperature of 35,000 p.s.i. This compares with the strength of pure chromium at about 30,000 p.s.i. when sintered under the same conditions.

The above specimen was tested in the flame of a kerosene-oxygen torch. The kerosene-oxygen torch used had a throat diameter of ¼ inch, and was run at a chamber pressure of 50 p.s.i. The gases exit from this throat at a velocity of Mach 1.8 and temperature of 4800° F., and the flame has a heat flux of 400 B.t.tu./ft.$^2$/sec. at 7½ inches from the throat. This heat flux was determined by holding a water cooled calorimeter in the flame. The sample was held in the flame at 7½ inches from the throat for 15 minutes without failure. During this time, the sample reached a surface temperature of 3500° F. as determined by an optical pyrometer. The kerosene-oxygen flame is highly oxidizing; but nevertheless, the specimen showed no erosion, and had a weight gain of 1.8 grams. The oxide layer produced during the test was from about .004 to about .006 inch thick.

By way of comparison, a chromium specimen made by intimately mixing:

| | Parts by wt. |
|---|---|
| Chromium (−325 mesh) | 99.0 |
| Nickel (−200 mesh) | 0.5 |
| Titanium (−200 mesh) | 0.5 | was sintered and tested in the same manner as was the metal-ceramic composite specimen as above described. This specimen burned through after only a 2 minute exposure to the flame. During this exposure, its surface reached a maximum temperature of 3050° F.

*Example V*

The following example shows that the improved properties which applicant's method of purification has is not also produced by the addition of other metal oxides which do not form a spinel.

The following mixture of powders was prepared and sintered in substantially the same manner as indicated above in Example IV:

| | Percent by wt. |
|---|---|
| Chrome powder (−200 mesh) | 95 |
| Al$_2$O$_3$ (−325 mesh) | 5 |
| Titanium powder (−325 mesh) | 0.5 |

When this material was tested in the kerosense-oxygen ports in the same manner given above for Example IV, erosion took place at a surface temperature of 2930° F. and exposure could only be sustained for 84 seconds. The erosion rate was .003 inch per second—this is an erosion rate of approximately 100 times that of the spinel forming cermet given in Example IV. Cermets of zirconia and thoria have been prepared and tested in the same manner given above in Example IV with the result that they display no better oxidation rates than the alumina cerment described in Example V.

*Example VI*

On the other hand, other metal monoxides which form a spinel show the same oxidation resistance given above in the materials of Example V.

An intimate mixture of the following materials was pressed together at 20,000 p.s.i. and sintered for 1 hour in vacuum at 3100° F. to give a modulus of rupture of 34,000 p.s.i.:

| | Parts by wt. |
|---|---|
| Electrolytic chromium (−325 mesh) | 94.9 |
| Calcium oxide (−325 mesh) | 5.1 |
| Titanium (−200 mesh) | 0.5 |

A 2 inch specimen was tested in the kerosen-oxygen flame of Example IV for 3 minutes without erosion and had a weight gain of 0.54 gram. The oxide layer formed was from about 0.004 inch to about 0.006 inch thick.

*Example VII*

An intimate mixture of the following materials was pressed together at 20,000 p.s.i. into a 2 inch specimen and sintered in hydrogen for 1 hour:

| | Parts by wt. |
|---|---|
| Electrolytic chromium (−325 mesh) | 96.0 |
| Beryllium oxide (−325 mesh) | 4.0 |
| Titanium (−200 mesh) | 0.5 |

This material was very porous but did not erode and lasted for 5 minutes in the kerosene-oxygen flame.

All metals are basically ductile, and considerable theory exists as to why these materials become brittle, and as to why there is a transition from a ductile behavior at elevated temperatures to a brittle behavior at lower temperatures. This transition is most pronounced in body centered cubic metals and occurs at generally predetermined temperatures which may be established by the impact test given above in Example I. According to existing theory, ductility is governed by the mobility of the metal atoms as established by the electrical forces that exist between the atoms and by the dislocation mobility in the crystals. The yield point of a metal is a characteristic of its ductility; and in general, the yield point of metals decreases with increasing temperature. On the other hand, the fracture strength for a metal changes very little with temperature, and is thought to be a function of many things among which are principal the surfaces energy of the metal. At some temperature that is peculiar to each metal, and which will vary with the amount of prior deformation at elevated temperatures which it has experienced, the yield and fracture strengths are equal. At this point, there is a transition from ductile to brittle behavior.

According to existing theories, prior deformation of the metal at elevated temperature (as by drawing etc.) lowers the transition temperature by causing any voids or dislocations in the grain structure to move in a manner improving the continuity of the grain structure. Impurities in the metal, such as absorbed nitrogen, increase transition temperature by building up pressures within the voids to thereby decrease the amount of external force which can be applied to the metal structure before fracture stress is exceeded.

Very pure chromium prepared with prior art methods has been made to have some ductility at room temperature after having been cold worked or strained at elevated temperatures. These prior art materials, however, when left exposed to the atmosphere for an appreciable length of time, do not retain their ductility below approximately 650° F. In addition, if these prior art chromium materials were heated above the recrystallization temperature in air, their ductility was lost. By way of contrast, the materials prepared according to the principles of the present invention, as for example that given in Example I above, can be left exposed to the atmosphere over extended periods of time and can be reheated above the recrystallization temperature in air or vacuo without destroying their ductility. This is because the spinels which they incorporate not only provide a protective shield around their surfaces; but have the ability to absorb or take out of the metal any nitrogen or embrittling materials which penetrate the metal from the outside. This is illustrated in Example VIII.

*Example VIII*

A material prepared in accordance with the procedure outlined in Example I and extruded in the same manner from a 2 inch billet but contaminated with hot cracked ammonia gas was annealed after extrusion by holding it at 1800° F. for 2 hours in vacuo. This material gave an ultimate strength of 52,100 p.s.i., a yield strength of 29,400 p.s.i., an elongation of 10.9%, and a reduction in area of 6.5%. By way of contrast, pure chromium prepared in accordance with Example I and extruded and contaminated as above was annealed after extrusion at 1800° F. for 2 hours in vacuum and gave an ultimate strength of 32,250 p.s.i., yield strength of 29,900 p.s.i., an elongation of 1.1%, and a reduction in area of 0.8%. Bend tests performed with both materials give the same general results.

It will be noted from the above example that applicant's cermets give ultimate strengths greater than that of pure chromium metal. This is true because of some dispersion hardening effect produced by the ceramic, and also because of greater ductility. In general, the cermets will produce strengths exceeding that of the metals when the ceramic is incorporated into the metal up to a volume percentage of approximately 15%. At volume percentages above 15% the base metal is still purified and is still dispersion hardened, but the volume percent of the base metal becomes so low that the strength of the cermet begins to drop below that of the non-purified base metal.

*Example IX*

The following mixture of powders may be sintered at 2100° F. for 3 hours:

| | Percent |
|---|---|
| Beryllium powder (—325 mesh) | 94.5 |
| $Al_2O_3$ powder (—325 mesh) | 5.5 |

This material may be heated in a vacuum to 1400° F. following which it may be hot worked in any suitable manner as for example by extrusion in the same manner given for the material in Example I. This material forms a $BeO \cdot Al_2O_3$ spinel dispersed throughout the berryllium metal which purifies the beryllium and maintains its purity in the manner above described, so that it will maintain its ductility even at room temperatures.

*Example X*

The principles of the present invention are not necessarily confined to powdered metallurgy techniques. Any method which will distribute the spinel in finely divided form throughout the base metal can be used. The following is given by way of example.

A —325 mesh $Cr_2O_3$ powder is introduced into a molten crucible of beryllium that is held in an argon atmosphere by introducing the powders into a cold stream of argon that is passed through jet pipes extending to the bottom of the crucible. The argon produces a mechanical mixing of the finely divided powders throughout the metal and at the same time cools the metal to its plastic state. Thereafter the material is placed in a press and hot worked to densify the material, following which it is held at 2000° F. for 5 hours in an argon atmosphere. Various amounts of the chrome oxide can be used, and in the present example, chrome sesquioxide is used in an amount of 10% by volume of the material. After holding the material for 5 hours at 2000° F. the material is allowed to cool down and a nickel envelope is flame sprayed over the beryllium. Thereafter the material is again heated to approximately 1800° F. and hot rolled into plates for fabrication. This material has better impact strength, and is more corrosion resistant than is the beryllium that has been produced heretofore.

If it should be desired to remove the spinel from the base metal after the spinel has removed the impurities, the spinel containing metal can be again melted in a controlled atmosphere to allow the spinel to settle out, following which it may be plated and worked as outlined above.

It will be apparent that applicant has not only provided a method of purifying metals generally; but has provided a whole new field of, what might be called, cermets having physical properties not heretofore produced.

While the invention has been described in considerable detail, I do not wish to be limited to the particular examples above described; and it is my intention to cover hereby all novel adaptations, modifications and arrangements thereof which will occur to those skilled in the art.

I claim:
1. A method of increasing the purity of metals to enhance their physical properties comprising: selecting a metal whose properties are to be enhanced and which forms an oxide which in turn will form a spinel, selecting a metal oxide which unites with the oxide of said selected metal to form a spinel, causing said metal oxide to be distributed in finely divided form throughout said selected metal, holding the metal and dispersed oxide at an elevated temperature which maintains said metal in a plastic state for sufficient time to permit formation of a spinel and purification of impurities in the metal by getter action of the spinel, reheating said metal to a molten condition, holding said metal in a molten condition in a protective atmosphere for a sufficient length of time for the spinel and impurities to settle out, cooling said metal in a protective atmosphere, and removing the portion containing the settled spinel and impurities.

References Cited

UNITED STATES PATENTS

| 2,104,427 | 1/1938 | Kreidl | 117—53 X |
| 2,580,171 | 12/1951 | Hagglund et al. | 75—124 |
| 2,591,460 | 8/1952 | Morrill | 148—6.35 |

DAVID L. RECK, *Primary Examiner.*

N. P. BULLOCH, H. W. TARRING,
*Assistant Examiners.*